May 1, 1956     H. A. HORST     2,743,547
HOOK GUARD
Filed Feb. 11, 1953
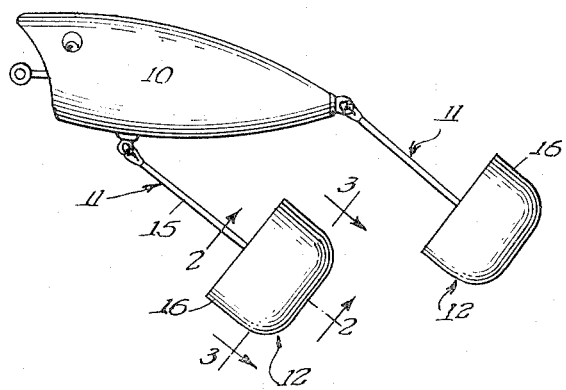
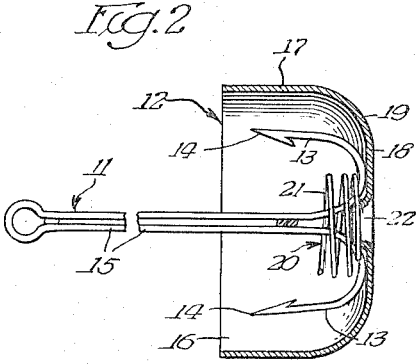
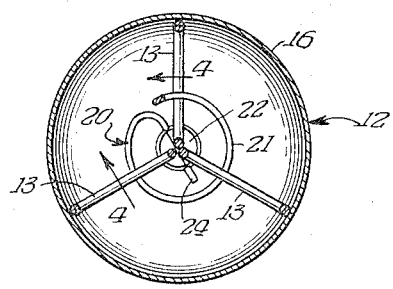
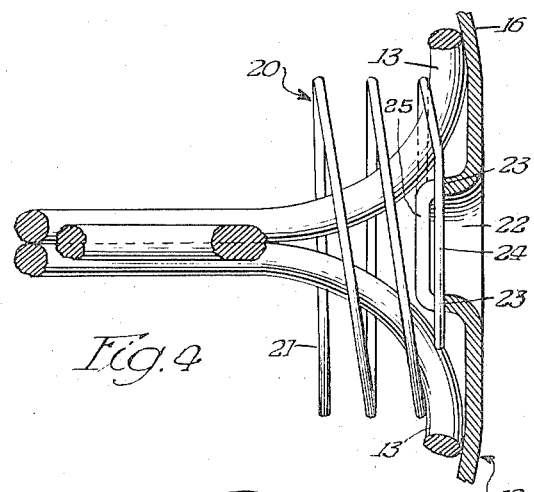
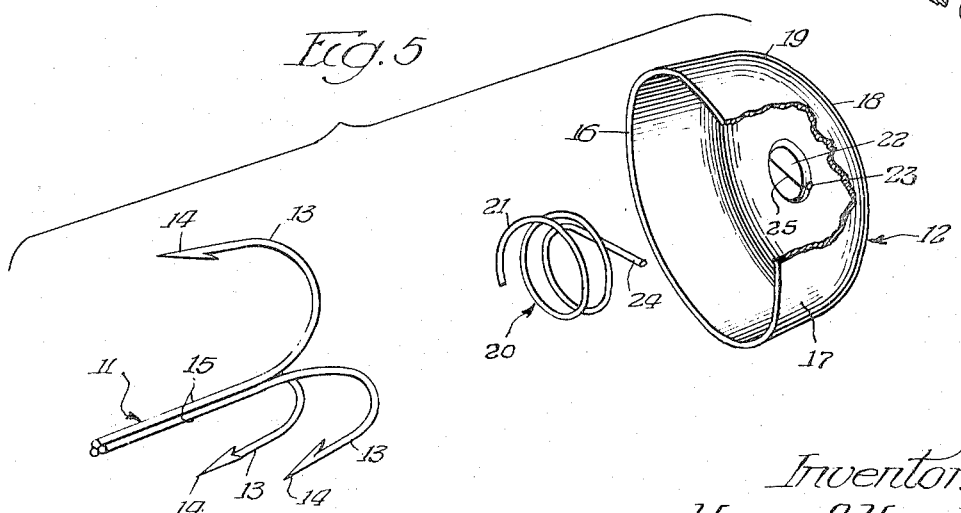
Inventor:-
Harry A. Horst
By:- Spencer, Johnston, Cook & Root
Attys

2,743,547
HOOK GUARD

Harry A. Horst, Davenport, Iowa

Application February 11, 1953, Serial No. 336,274

10 Claims. (Cl. 43—54.5)

The present invention relates, in general, to guards for hooks, and has more particular reference to an inexpensive, readily applied guard device especially well-suited for enclosing and guarding the pointed tines of fish hooks.

An important object of the present invention is to provide an exceedingly inexpensive hook guard comprising a preferably sheet metal housing adapted to enclose the pointed end portions of a fish hook, including simplified, low cost means for detachably securing the housing in mounted position upon the fish hook.

Another important object is to provide a guard for so-called gang hooks comprising a plurality of tines disposed on a common shank and arranged radially of the shank; a further object being to provide a guard comprising a cup-shaped housing adapted for application on the gang hook in position enclosing the radially disposed tines and including simple and inexpensive means for detachably securing the housing in hook-mounted position.

Another important object is to provide a hook guard comprising a housing and resilient spring anchoring means formed on the housing for detachably and resiliently securing the housing on the hook structure by action of said resilient spring anchoring means.

Another important object is to provide a hook guard comprising a cup-shaped housing having a preferably helical spring mounted on the bottom of the cup-shaped housing and preferably in coaxial alignment therewith to provide resilient means adapted for engagement with the hook structure to be guarded, whereby to resiliently and demountably secure the housing on the hook structure.

The foregoing and numerous other important objects, advantages, and inherent functions of the invention will become apparent as the same is more fully understood from the following description, which, taken in connection with the accompanying drawing, discloses a preferred embodiment of the invention.

Referring to the drawing:

Figure 1 is a side view of a fishing lure embodying a pair of gang hook structures having attached hook guards embodying the present invention;

Figures 2 and 3 are enlarged sectional views respectively taken substantially along the lines 2—2 and 3—3 in Figure 1;

Figure 4 is an enlarged sectional view taken substantially along the line 4—4 in Figure 3, the anchoring means being shown in full; and Figure 5 is an exploded perspective view showing the several parts illustrated in Figure 4, portions being broken away.

To illustrate the invention, the drawing shows a conventional fishing lure 10 embodying a pair of gang hooks 11 each carrying a hook guard 12 embodying the present invention.

The gang hooks 11 each comprise a plurality of tines 13 terminating in barbed points 14 mounted on a common shank 15, there being, in the illustrated embodiment, three radially extending tines 13, each tine extending in a plane making an angle of the order of 120° with respect to the planes of the other tines. The gang hook, of course, may embody any desired number of radially extending tines disposed at any desired relative angularity with respect to the common shank.

As shown also, each tine may be formed integrally on a corresponding mounting stem and the stems may then be integrally secured together, as by soldering or welding, in order to form the common shank 15 of the gang hook.

The guard 12 preferably comprises a cup-shaped housing 16 having cylindrical side walls 17 and a bottom wall 18, the side walls curvingly merging into the bottom wall as shown at 19. The housing is preferably sized and configurated to snugly receive the tines 13 of the hook structure 11 entirely within the housing with sufficient tolerance to permit relative turning movement of the housing with respect to the outer end portions of the tines. When mounted in tine guiding position on the hook structure, the outer portions of the tines may extend immediately within and adjacent the cylindrical and curved portions of the housing.

The housing may be provided with resilient spring means 20 in position yieldingly to engage the tines of the hook structure and to be interlocked therewith in response to turning movement of the housing with respect to the hook structure when in tine enclosing position. To this end, the resilient means 20 may conveniently comprise a helical spring 21 secured at one end on the housing 16, the opposite end of the spring being entirely free within the housing.

The spring 21 is preferably anchored upon the bottom wall 18 of the housing in coaxial alignment with the central axis of the cup-shaped housing. To this end the bottom wall 18 of the housing may be formed centrally with an inwardly pressed embossment 22 of inverted cup-shaped configuration, the side walls of the embossment being formed with diametrally aligned perforations providing seats 23 adapted to receive a diametrally arranged straight end portion 24 of the spring 21, which end portion may be soldered or otherwise secured in position extending through the perforations 23 to thus mount the helical spring upon the bottom of the housing and in coaxial alignment therewith. If desired, the embossment 22 may be provided with a diametral slit 25 extending between and communicating with the spring seat perforations 23. The end portion 24 of the spring may be assembled in the seats 23 by passing same through the slit 25 which may then be closed to secure the spring in mounted position by pressing together the embossment portions on opposite sides of the slit.

It will be seen that the guard may be applied to a hook structure merely by pressing the housing 16 over the tines of the hook structure and then relatively rotating the housing on the hook structure to screw the tines into the convolutions of the spring, the spring serving resiliently to hold the guard upon the hook structure when the tines of the latter are threadedly intermeshed with the convolutions of the spring.

A guard made in accordance with the present invention may be detached from a hook structure on which mounted merely by relatively turning the guard on the structure in a direction to screw the tines out of the spring 21.

It will be apparent that guards embodying the present invention may be manufactured at minimum expense since the same merely comprise an inexpensive housing and a low cost anchoring spring attached in the housing. The housing may comprise a molded shell of plastic or other material adapted to be pressed to desired shape in dies or molds, or the housing may be formed of sheet metal by a simple stamping, spinning, or pressing operation.

The hook guard of the present invention, however, affords absolute protection against the snagging of hooks as in the clothing of the user, or in associated equipment, including fishing lines and the like; and the guard further affords substantial mechanical protection for the pointed ends of fish hook tines, a further facility being that the guard may be quickly and easily applied to a hook structure to be guarded, and as readily removed therefrom whenever desirable.

It is thought that the invention and its numerous attendant advantages will be fully understood from the foregoing description, and it is obvious that numerous changes may be made in the form, construction and arrangement of the several parts without departing from the spirit or scope of the invention as defined by the appended claims, or sacrificing any of its attendant advantages, the form herein disclosed being a preferred embodiment for the purposes of illustrating the invention.

The invention is hereby claimed as follows:

1. A guard for a hook structure comprising a cup-shaped housing of relatively rigid material having a bottom wall and integral peripheral side walls curvingly merging with the bottom wall and adapted to turnably receive the tine portions of a hook structure to be guarded within said peripheral walls, and resilient means for holding a guarded hook structure in the housing in position engaging said bottom wall, said resilient means being secured on the bottom wall of the housing in position to latchingly engage said tine portions in response to relative turning movement of the housing with respect to the hook structure.

2. A guard for a hook structure comprising a cup-shaped housing of relatively rigid material having a bottom wall and integral peripheral side walls curvingly merging with the bottom wall and adapted to turnably receive the tine portions of a hook structure to be guarded within said peripheral walls, and anchorage means comprising a spring for holding a guarded hook structure in the housing in position engaging said bottom wall, said anchorage means being secured on the bottom wall of the housing in position to latchingly engage said tine portions in response to relative turning movement of the housing with respect to the hook structure.

3. A guard for a hook structure comprising a cup-shaped housing of relatively rigid material having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage said tine portions in response to relative turning movement of the housing with respect to the hook structure.

4. A guard for a hook structure comprising a cup-shaped housing of relatively rigid material having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage said tine portions in response to relative turning movement of the housing with respect to the hook structure, said bottom wall having a central inwardly pressed embossment and said spring at one end having a portion extending through and secured to said embossment.

5. A guard for a hook structure comprising a cup-shaped housing of relatively rigid material having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage said tine portions in response to relative turning movement of the housing with respect to the hook structure, said bottom wall having a central inwardly pressed embossment, said spring at one end having a portion extending in said embossment and said portion being secured by solder in said embossment.

6. A guard for a hook structure comprising a cup-shaped housing of relatively rigid material having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage said tine portions in response to relative turning movement of the housing with respect to the hook structure, said bottom wall having a central inwardly pressed embossment formed with a diametral slit connected with and between spaced and diametrally aligned seats on the opposite sides of the embossment and said spring at one end having a portion extending in said seats and secured to said embossment.

7. A guard for a hook structure comprising a cup-shaped housing a relatively rigid material having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage said tine portions in response to relative turning movement of the housing with respect to the hook structure, said bottom wall having a central inwardly pressed embossment formed with a diametral slit connected with and between spaced and diametrally aligned seats on the opposite sides of the embossment, said spring at one end having a portion extending in said seats and said embossment being deformed to dispose the slit defining portions thereof in clamping relation with said spring portion to secure the same in mounted position in said seats.

8. A guard for a hook structure comprising a cup-shaped housing of formed sheet metal having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage and yieldingly secure said tine portions upon said bottom wall in response to relative turning movement of the housing with respect to the hook structure, said bottom wall having a central inwardly impressed embossment formed therein and said spring at one end having a portion extending through and secured to said embossment.

9. A guard for a hook structure comprising a cup-shaped housing of formed sheet metal having a bottom wall and integral peripheral side walls curvingly merging with the bottom wall and adapted to turnably receive the tine portions of a hook structure to be guarded within said peripheral walls, and a helical spring secured upon said bottom wall coaxially within said peripheral walls in position to latchingly engage and yieldingly secure said tine portions upon said bottom wall in response to relative turning movement of the housing with respect to the hook structure.

10. A guard for a hook structure comprising a cup-shaped housing of formed sheet metal having a bottom wall and integral peripheral side walls curvingly merging with the bottom wall and adapted to turnably receive the tine portions of a hook structure to be guarded within said peripheral walls, and resilient means for holding a guarded hook structure in the housing in position engaging said bottom wall, said resilient means being secured on the housing in position to latchingly engage the tine portions of a guarded hook structure in response to relative turning movement of the housing with respect to said structure.

References Cited in the file of this patent

UNITED STATES PATENTS

| | | |
|---|---|---|
| 1,547,814 | Hyde | July 28, 1925 |
| 2,204,185 | Lougheed | June 11, 1940 |
| 2,491,722 | Gelardin | Dec. 20, 1949 |
| 2,600,314 | Miner | June 10, 1952 |

FOREIGN PATENTS

| | | |
|---|---|---|
| 210,681 | Great Britain | Feb. 7, 1924 |
| 802,962 | Germany | Feb. 26, 1951 |